United States Patent [19]

Baker et al.

[11] Patent Number: 4,995,083

[45] Date of Patent: Feb. 19, 1991

[54] METHOD OF ESTABLISHING A RADIO LINK IN ONE OF A PLURALITY OF CHANNELS BETWEEN TWO RADIO UNITS

[75] Inventors: John M. Baker; Peter N. Proctor, both of Basingstoke; Andrew S. Pearce, Nottingham, all of Great Britain

[73] Assignee: GEC Plessey Telecommunications Limited, Coventry, England

[21] Appl. No.: 387,156

[22] Filed: Jul. 31, 1989

[30] Foreign Application Priority Data

Sep. 2, 1988 [GB] United Kingdom ............... 8820774

[51] Int. Cl.$^5$ .................... H04K 1/00; H04K 9/00; H04M 11/00
[52] U.S. Cl. ........................... 380/23; 379/62; 455/33; 455/34
[58] Field of Search ............. 379/62; 380/23; 455/33, 455/34

[56] References Cited

U.S. PATENT DOCUMENTS

| | | | |
|---|---|---|---|
| 4,574,163 | 3/1986 | Zato | 380/23 |
| 4,654,481 | 3/1987 | Corris et al. | 379/62 |
| 4,853,951 | 8/1989 | Bauer | 379/62 |

FOREIGN PATENT DOCUMENTS 0196834 10/1986 European Pat. Off. ............. 379/62

*Primary Examiner*—Stephen C. Buczinski
*Attorney, Agent, or Firm*—Fleit, Jacobson, Cohn, Price, Holman & Stern

[57] ABSTRACT

The method comprises transmitting an initiating signal in the form of a bit pattern as a continuous burst from one radio unit to the other. The pattern incorporates a preamble pattern and a security code having a plurality of bit sequences. Each sequence is transmitted a number of times. The received security code is compared with stored codes in the other unit, and if a matching pair is identified a response signal is transmitted from the other unit to said one unit. The response signal incorporates the preamble pattern for establishing synchronization between the radio units.

3 Claims, 2 Drawing Sheets

METHOD OF ESTABLISHING A RADIO LINK IN ONE OF A PLURALITY OF CHANNELS BETWEEN TWO RADIO UNITS

FIELD OF THE INVENTION

The present invention relates to a method of establishing a radio link in one of a plurality of channels between two radio units of a multi-channel communication system.

The present invention finds application in the field of mobile telecommunications systems and particularly cellular radio telecommunications systems.

SUMMARY OF THE INVENTION

The present invention has the advantages of reducing the cost of multiple radio link base stations used in such systems and permits production of identical handsets for domestic and business use.

STATEMENT OF THE OBJECT OF THE INVENTION

According to the present invention there is provided, a method of establishing a digital radio link in one of a plurality of channels between two radio units of a multi-channel communication system, comprising transmitting an initiating signal in the form of a bit pattern as a continuous data stream burst from one radio unit to the other, the bit pattern incorporating a preamble pattern and a security code comprising a plurality of bit sequences, each bit sequence being transmitted a plurality of times in said continuous data stream burst, comparing the received security code with one or more codes stored within said other radio unit whereupon, if a matching pair of codes is identified, a response signal is transmitted from said other radio unit to said one unit, the response signal incorporating the preamble pattern for establishing synchronisation between the radio units.

BRIEF DESCRIPTION OF THE DRAWINGS

An embodiment of the present invention will now be described with reference to the accompanying drawings wherein.

In a digital cordless telephone system utilizing multiple radio channels and achieving duplex operation by time division duplex, digital bit and frame synchronisation has to be established before communication can proceed.

DESCRIPTION OF THE PREFERRED EMBODIMENT

The radio system comprises cordless portable units and cordless fixed units where the cordless fixed units may comprise either a single radio subsystem utilising a single radio channel at any one time, or multiple radio subsystems utilising multiple radio channels simultaneously.

In order to establish synchronism, the portable unit acts as a synchronous slave to the fixed unit taking the timing of transmit and receive frames from the fixed synchronism of the fixed unit. This ensures that all radio subsystems in a multi-channel fixed unit will remain in fixed transmit and receive synchronism, one with every other, independently of the timing starting or ending link establishment.

When the cordless portable unit initiates the connection a burst comprising a continuous data stream of 25 frames is transmitted without pause. The data stream contains a repeated sequence of a unique data marker code preceding the identity of the portable unit. The sequence is such that the fixed unit is able to temporarily achieve bit synchronism without changing frame synchronism and by reading every other frame (i.e., fixed part receive frames) is able to extract the handset identity regardless of where the boundaries in the 25 frame transmission lies with respect to the fixed unit frame synchronism.

At the end of the continuous transmission the portable unit goes to a continuous listen mode. The fixed unit commences burst mode transmission of a link synchronisation control signal to its fixed frame and bit synchronism.

The portable unit on receiving the link synchronisation control signal now establishes a burst frame and bit synchronism derived from the incoming fixed part signal, and commences to transmit burst synchronised to the receive period of the fixed part unit.

The link is now established and communication of telephony signalling and voice can proceed.

Figure 1:
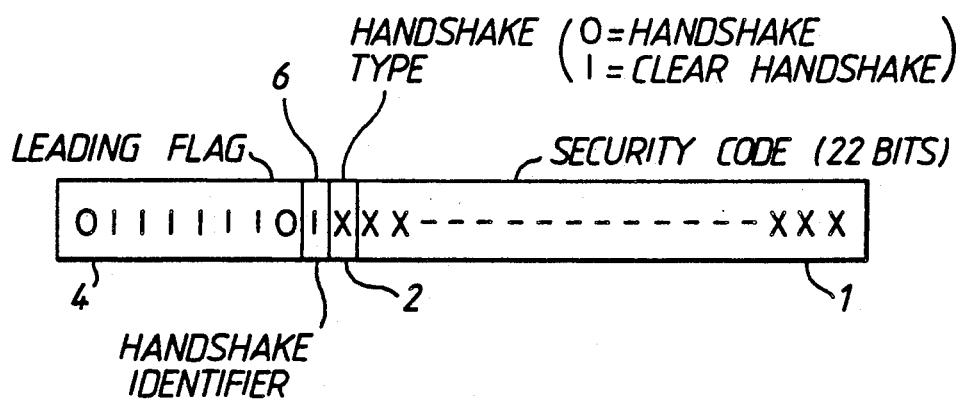
FIG. 1 shows the format of a handshake signal.

To establish a radio link two basic types of control signal are used. The first, shown in FIG. 1 and is a handshake type of signal which carries the security code, 1 for identifying fixed and portable units to their associated counterparts but carries no error detection field (CRC field). This type of signal takes two forms the regular 'Handshake' signal which is used to verify association between units during a call. This form is signified by a 'zero' in the Handshake Type Field, 2 and the 'Clear Handshake' signal which is used to clear down connections. This form is signified by a 'one' in the Handshake Type Field, 2. At least three consecutive valid "Clear Handshake" signals must be received by a part before it clears down in response.

Figure 2:
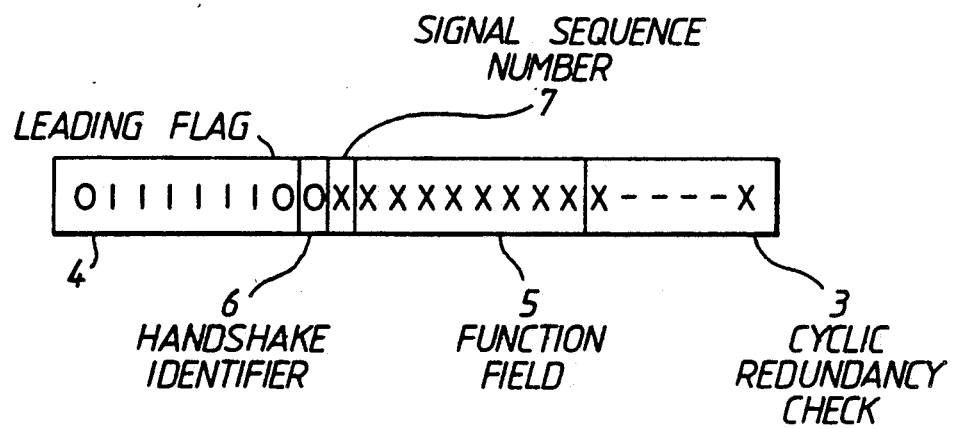
FIG. 2 shows the format of a call control signal.

The second type of signal consists of the call control set of signals as shown in FIG. 2. This set carries no security code but possesses an error detection field, 3. The acknowledge signal is included in the Call Control signal set.

The constituent parts of the call signals are as follows:

Leading Flag (Header)

This field 4, indicates the start of a level 2 signal frame to the receiving station. It is an 8-bit field and takes the binary form:

01111110

A trailing flag is unnecessary with this form of compelled signalling.

Bit Stuffing

For all fields other than the Leading Flag a logical 'zero' is inserted after any sequence of five logical 'ones' is encountered. This is applied even if the sequence of five 'ones' crosses field boundaries.

The Leading Flag is therefore uniquely identified as a sequence of size logical 'ones' bounded on each side by a logical 'zero'.

The Bit Stuffing operation, is carried out in the burst mode device.

Control Signal Function Field

The function field 5 consists of 8 bits. The function field contains the information that is to be transferred e.g. dialled digits etc.

Acknowledge Signal

A special signal which can be included in the set of Call Control signals is the Acknowledge signal. This signal would of course only be sent in response to an incoming Call-Control signal frame and as such, in a compelled signalling scheme as outlined, would not enter into the signal sequence numbering scheme. There are two principal reasons for this:

(a) There is no need to number the Acknowledge signal because the link end which transmitted the original Call Control signal will keep re-transmitting it until it receives acknowledgement.

(b) At a given link end, acknowledgements of received signals can be interspersed with signals originating at that end. In this case the integrity of the sequence numbering must be preserved for the originating signal sequence.

Acknowledge signals should therefore be unnumbered and the modulo 2 numbering sequence should only be updated at a link end by Call Control signals, other than acknowledgements, originating at that end.

The specific format for the (unnumbered) Acknowledge signal can be a Call Control signal with all logical zeros in the Function field. When this signal is transmitted, no updating of the Signal Sequence Number takes place and when this signal is received, no account is taken of the Signal Sequence Number field.

Security Code

The final field 1, in the handshake signal frame, is the security code. This field is 22 bits in length resulting in 4,194,304 possible combinations which are used to uniquely associate the base station (fixed unit) with the handset, (portable unit). This code, must be read directly from the associated memory device.

Handshake Clear

Upon receipt at the opposite parts of a handshake clear signal, the respective parts enters the 'clear down' sequence. This is indicated by a '1' in the handshake identifier field, 6.

Error Detection

The method for providing error protection for control signal messages transmitted across the signalling link consists of a scheme where signals are checked for errors at the receiver. If no errors are found, an acknowledgement is returned. Conversely, if an error is found, no acknowledgement is returned, in which case the sending end re-transmits the signal.

A cyclic redundancy check (CRC) field 3 is appended to the control signal to enable error detection to be carried out at the receiver.

The generator polynomial which results in a CRC field of 6 is given below. This generator polynomial results in the following characteristics:

(a) The number of bits in the CRC field (CRC BITS)=6.

(b) The maximum number of bits in the information field (INF BITS)=25.

(c) Error detection capabilities guaranteed by using the polynomial, provided the stated maximum number of bits in the information field is not exceeded, results in two bursts of length 2 or less. Any odd number of errors. A burst of length 6 or less 96.88% or burst of length to 98.44% of longer length.

The generator polynomial from which the error correction capabilities of the codes are derived is:

$$(1+x^2+x^5)(1+x)$$

To establish a radio link the handshake signal is sent from the calling subscriber under the control of a timer. The signal is subjected to a timeout indicating loss of handshake signals if a link is not established. When the link is established the handshake signal from the called subscriber is sent with matching security code. The handshake signal is subject to timeout. The link is cleared down when the timeouts have expired or when the call originator clears down.

The protocol for sending call control signals is as follows. Data is put into the function field, and other call control signal fields are attached. The handshake identifier bit 6 is made equal to zero, and the current sequence number is put into the signal sequence number field, 7.

The cyclic redundant check code value is complied and put into the CRC field, 3.

The call control signal is sent to the other unit, and an acknowledgement timer is activated. The call control signal is repeatedly sent until the acknowledgement signal is received, whereupon the signal sequence number is incremented.

Figure 3:
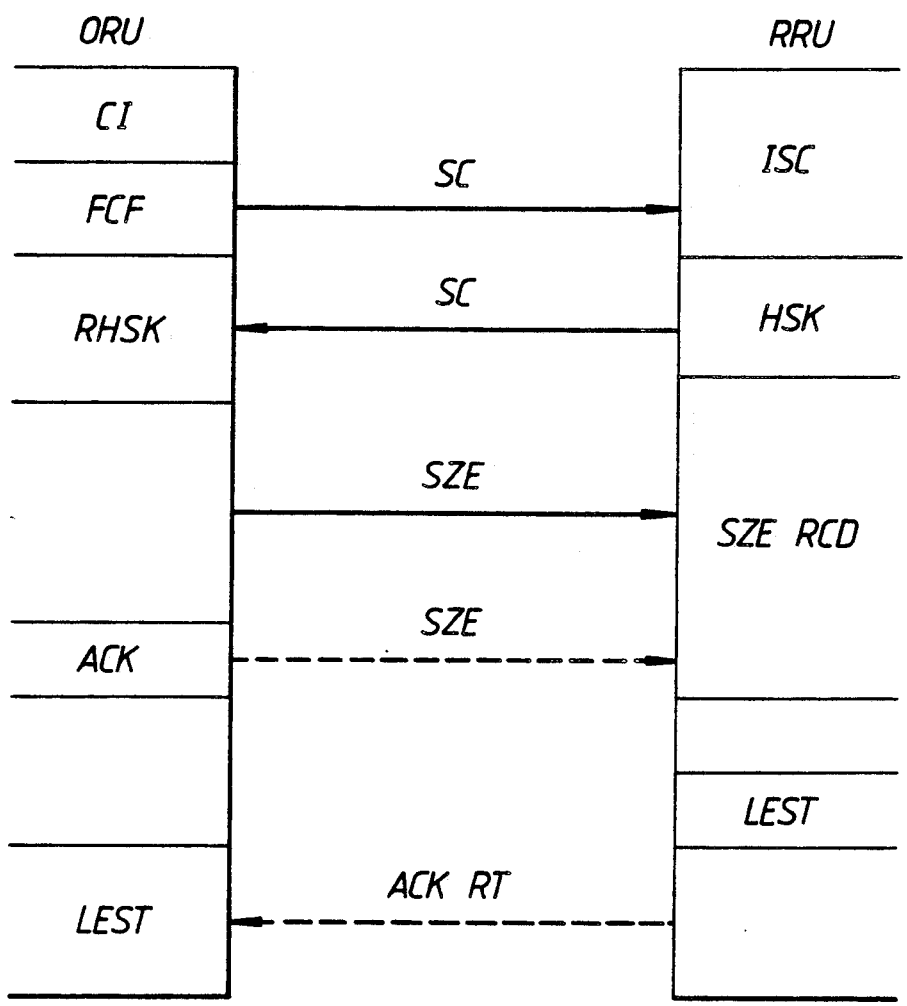
FIG. 3 shows a link level sequence diagram.

Referring to FIG. 3, the interchange is shown between an originating radio unit ORU, and the receiving radio unit, RRU. The RF link is shown between the two radio units. The originating unit indicates a call CI and finds a free channel FCF. The security code SC is sent continuously. Meanwhile the receiving unit is idle and scans the channels, ISC. When the receiving unit receives the handshake HSK it returns a security code SC to the originating unit on a continued basis. The originating unit receives a returned handshake RSHK, and seizes SZE, the RF link. If an acknowledgement timer ACK in the originating unit expires seizure SZE continues as required. The receiving unit recognises the seized condition and the link is established, L EST. An acknowledge signal ACK RT is returned to the originating unit when further seizure signals a received by the receiving unit. When the acknowledge signal is received by the originating unit it recognises the establishment L.EST of the RF link.

We claim:

1. A method of establishing synchronization in a digital radio link in one of a plurality of channels between two radio units of a multi-channel communication system, comprising transmitting an initiating signal in the form of a bit pattern as a continuous burst from one radio unit to the other unit, said continuous data stream burst having a timing which is independent of the synchronism achieved, and said other unit temporarily achieving bit synchronism without changing frame synchronism, the bit pattern incorporating a preamble pattern and a security code comprising a plurality of bit sequences, each bit sequence being transmitted a plurality of times in said continuous burst, comparing the received security code with one or more codes stored within said other radio unit, whereupon, if a matching pair of codes is identified, a response signal is transmitted from said other radio unit to said one unit, the response signal incorporating the preamble pattern for establishing synchronisation between the radio units.

2. A method of establishing synchronism in a digital radio link as claimed in claim 1, wherein one radio unity is a portable unit and the other is a fixed unit and together form a cordless telephone.

3. A method of establishing synchronism in a digital radio link as claimed in claim 2, wherein the portable unit acts as a synchronous slave to the fixed unit, taking timing of transmit and receive frames from the fixed unit.

* * * * *